United States Patent [19]
Valiant

[11] Patent Number: 5,608,870
[45] Date of Patent: Mar. 4, 1997

[54] SYSTEM FOR COMBINING A PLURALITY OF REQUESTS REFERENCING A COMMON TARGET ADDRESS INTO A SINGLE COMBINED REQUEST HAVING A SINGLE REFERENCE TO THE TARGET ADDRESS

[75] Inventor: Leslie G. Valiant, Belmont, Mass.

[73] Assignee: The President and Fellows of Harvard College, Cambridge, Mass.

[21] Appl. No.: 459,367

[22] Filed: Jun. 2, 1995

Related U.S. Application Data

[63] Continuation of Ser. No. 972,856, Nov. 6, 1992, abandoned.

[51] Int. Cl.$^6$ .............................. G06F 15/16; G06F 13/20
[52] U.S. Cl. ..................... 395/200.1; 395/410; 395/800; 395/823; 340/825.52
[58] Field of Search ................................ 395/200.1, 800, 395/410, 823; 340/825, 825.52

[56] References Cited

U.S. PATENT DOCUMENTS

| | | | |
|---|---|---|---|
| 3,614,745 | 10/1971 | Podvin et al. | 340/172.5 |
| 3,935,394 | 1/1976 | Bulfer | 179/18 ES |
| 4,215,402 | 6/1980 | Mitchell et al. | 364/200 |
| 4,752,777 | 6/1988 | Franaszek | 340/825.79 |
| 5,083,265 | 1/1992 | Valiant | 395/800 |
| 5,105,424 | 4/1992 | Flaig et al. | 370/94.1 |
| 5,117,420 | 5/1992 | Hillis et al. | 370/60 |
| 5,313,649 | 5/1994 | Hsu et al. | 395/800 |

OTHER PUBLICATIONS

L. G. Valiant, "General Purpose Parallel Architectures", *Handbook of Theoretical Computer Science*, (North Holland, Amsterdam) (1990):944–971.

A. Gottlieb et al., "The NYU Ultracomputer–Designing an MIMD Shared Memory Parallel Computer", *IEEE Trans. On Computers*, C–32(2), (1983):175–189.

A. Ranade, "How to Emulate Shared Memory", *Proc. 28th IEEE Symp. on Foundations of Computer Science* (1987):185–194.

C. P. Kruskal et al., "A Complexity Theory of Efficient Parallel Algorithms", *Theor. Comp. Sci. 71*, (1990):95–132.

Yew, Pen–Chung, et al., "Distributing Hot–Spot Addressing in Large–Scale Multiprocessors," *IEEE Transactions on Computers*, C–36 (4) : 388–395, (Apr. 1987).

Tang, Peiyi, et al., "Software Combining Algorithms for Distributing Hot–Spot Addressing," *Journal of Parallel and Distributed Computing*, 10:130–139, (1990).

*Primary Examiner*—Thomas C. Lee
*Assistant Examiner*—Rehana P. Krick
*Attorney, Agent, or Firm*—Hamilton, Brook, Smith & Reynolds, P.C.

[57] ABSTRACT

Requests are routed between components in a parallel computing system using multiple-phase combining. In the first phase, the original requests are decomposed into groups of requests that share the same destination address. The requests in each group are combined at an intermediate component into a single request per group. In subsequent phases, the combined requests are themselves grouped and combined in intermediate components. In the final phase, the combined requests are processed by the component containing the destination address. The addresses of the intermediate components are determined in part by hashing on the destination address and in part by a distributing function. The hashed portion of the intermediate component address tends to converge the combined requests toward the destination component during each phase. The distributing portion of the intermediate component address tends to distribute the workload evenly among the components.

47 Claims, 11 Drawing Sheets

SYSTEM FOR COMBINING A PLURALITY OF REQUESTS REFERENCING A COMMON TARGET ADDRESS INTO A SINGLE COMBINED REQUEST HAVING A SINGLE REFERENCE TO THE TARGET ADDRESS

GOVERNMENT SUPPORT

The invention described herein was supported in whole or in part by Grant No. NSF-CCR-89-02500 from the National Science Foundation.

RELATED APPLICATION

This application is a continuation of application Ser. No. 07/972,856 filed on Nov. 6, 1992, which is incorporated herein by reference in its entirety now abandoned;

BACKGROUND OF THE INVENTION

A general purpose parallel computer may have to process concurrent memory accesses requested by possibly thousands of processors in the computer. Several or all of the processors may have to read the same memory address at the same time. In addition, several or all of the processors may have to write a value into the same memory address, in which case some convention must be adopted about the desired outcome. In either case, the read/write requests must converge from the various parts of the physical system to one location. As each request is sent to a destination component containing the relevant address, the destination component requires time to handle the request proportional to the number of requests arriving there. In general, this overhead becomes unacceptable if the number of processors, p, is large, if no special provisions are made for combining.

SUMMARY OF THE INVENTION

The overhead, potentially linear in p, can be overcome by implementing the requests in more than one stage. In the first stage, for example, the requests to any one ultimate destination converge in groups at various intermediate components, where each request group is combined into a single request to be forwarded in the next stage. In the last stage, all extant requests to an address finally converge to the chosen location. Hence, the requests can be viewed as flowing from the leaves of a tree to the root.

In some instances, as when the concurrent requests implement a read statement, a flow of information in the reverse direction, from the root to the leaves, must follow. In these instances, whenever requests are combined at a component, the sources of the requests in that stage are stored at that component, so a complete record of the structure of the tree is maintained. In a general pattern of requests, accesses to several memory addresses may be present. In that case a combining tree has to be maintained for each destination address.

A goal of the invention is to provide an efficacious method of providing a multiple processor computer with a combining facility that is acceptably efficient for the widest range of concurrent access patterns, but that does not require a hardware combining network. The method is universal, that is, it operates with no programmer intervention other than possibly the setting of a small number of parameters. Examples of proposals for such combining networks can be found in A. Gottlieb et al., "The NYU Ultracomputer— Designing an MIMD Shared Memory Parallel Computer," *IEEE Trans. on Computers*, C-32:2 (1983):175–189, and in A. Ranade, "How to Emulate Shared Memory," *Proc. 28th IEEE Symp. on Foundations of Computer Science* (1987):185–194. This invention is supportive of the Bulk Synchronous Parallel (BSP) model of computation, in which the basic medium of inter-processor communication is a router, which delivers messages among the components point-to-point, but performs no combining operations itself. Shared memory with arbitrary concurrent accesses can be simulated asymptotically on a p-processor BSP machine with only constant loss in efficiency, if the simulated program has $p^{1+\epsilon}$-fold parallelism for some positive constant $\epsilon$. An important advantage of having as the communication medium this simplest option is that the medium makes possible a competition for the highest throughput router among the widest possible range of technologies, including optical ones. In contrast, a communication medium that is required to perform more complex operations imposes more constraints on the technology and may preclude the use of the one that is most efficient for the basic routing operation, which is the most important.

In a preferred embodiment of the invention, a simple router is sufficient to implement concurrent accesses efficiently. A system is described that is more efficient and practical than previous proposals. For example, experiments show that for p=4096 and with each processor making 32 requests, the cost of arbitrary concurrency patterns as compared with no concurrency is no more than a factor of about 3.5, even if nothing is known about the pattern. If the degree of concurrency is known then the factor becomes even smaller.

Such a system is efficacious because it invests the bulk of resources for communication in building a simple router with maximal throughput. Every general purpose parallel machine must also have mechanisms for implementing arbitrary patterns of concurrent accesses. However, difficult access patterns occur rarely enough, and the system described here for dealing with them is efficient enough, that substantial investments in combining networks are not warranted.

The invention provides a method of decomposing (i.e. grouping) a group of requests to a common destination address into a plurality of request subgroups, each request subgroup to be processed by an intermediate component. In the intermediate components, the requests in each request subgroup are combined into fewer requests, preferably a single combined request. The requests from the intermediate components may be further decomposed and combined until a small number of destination requests per destination address are obtained. The destination requests are processed at the destination address. Thus, multiple requests are efficiently managed to reduce processing overhead.

A preferred embodiment of the invention provides a multiple-phase system for routing requests on a parallel processing computer. The computer comprises components, with each component having a unique identifier. The component identifiers are preferably sequential integers. Each component may have processing and memory capability for sending and processing requests. Each request originates at a source component and references a destination address, where a request operation is to be performed by a destination component. The destination address may be in the address space of the destination component. The computer also comprises a router for directing requests point-to-point between components. Requests through the router are directed by a basis sequence, which may be supplied by a user. The basis sequence is a sequence of integers, each integer in the basis sequence associated with a respective phase of the routing system. The product of the integers equals the number of components on the system. Preferably, the integers are powers of two. The number of requests that can be combined into one request in any one phase is determined from the basis sequence. The routing system is capable of routing requests either synchronously or asynchronously, depending on the request operation.

A preferred embodiment of the invention provides a dynamic multiple-phase method of routing requests among components in a parallel processing computer system. Each request references a respective destination address. A hashing process is used by the components to direct requests to intermediate components via the router. The intermediate components combine requests into destination requests. The forming of destination requests may involve multiple phases of combining, where each intermediate component combines requests destined to the same destination address into combined requests. Finally, the destination requests are directed to destination components having access to respective destination addresses, where the destination requests are processed.

The invention performs at least two phases of routing for each original request. In at least one phase, destination requests for each destination address are formed by directing and combining requests. The router directs requests to intermediate components, the intermediate components being dependent on the destination addresses of respective requests. At each intermediate component, requests are combined to form combined requests for requests having the same destination address. The combining is done using commutative and associative operations on the requests. Thus, compatible requests having the same destination address are combined into a single destination request. Further combining may be done in further intermediate components until destination requests are formed for directing to destination components. The destination requests are directed to respective destination components in a last phase, where the destination request is processed.

In a preferred embodiment of the invention, the intermediate components are determined based on the destination address of the requests. In particular, the identifiers of the intermediate components are divided into two portions. A first portion is obtained based on the destination address, preferably by hash functions. A second portion is generated independently of the destination address. The second portion may be generated by a pseudo-random number generator or by a function based on the source component. Thus, the first portion directs a group or subgroup of requests to a set of intermediate components, and the second portion distributes the request across that set of intermediate components in smaller subgroups. Each request being sent by a component through the router is directed to a component having an identifier determined by the sending component. At each phase, the number of requests referencing the same destination address is reduced by combining the requests into increasingly smaller numbers of combined requests by distributing the combining process among arbitrary intermediate components. For the last phase, the destination component identifier may be either a physical address or may be provided by hashing on the virtual destination address, if the memory uses a hashed address space.

The identifier of the component to receive the request in the next phase is controlled by the basis sequence of integers. When component identifiers are determined, the relative sizes of the high-order and low-order portions are controlled by the basis sequence. As processing flows through each phase, the relative size of the hashed high-order portion increases while the relative size of the independent low-order portion decreases. Thus, during each phase, the identifiers converge toward the identifier of the destination component with fewer components available for processing the requests.

BRIEF DESCRIPTION OF THE DRAWINGS

The forgoing and other objects, features and advantages of the invention will be apparent from the following more particular description of preferred embodiments of the invention, as illustrated in the accompanying drawings in which like reference characters refer to the same parts throughout the different views.

DETAILED DESCRIPTION OF A PREFERRED EMBODIMENT OF THE INVENTION

Figure 1:
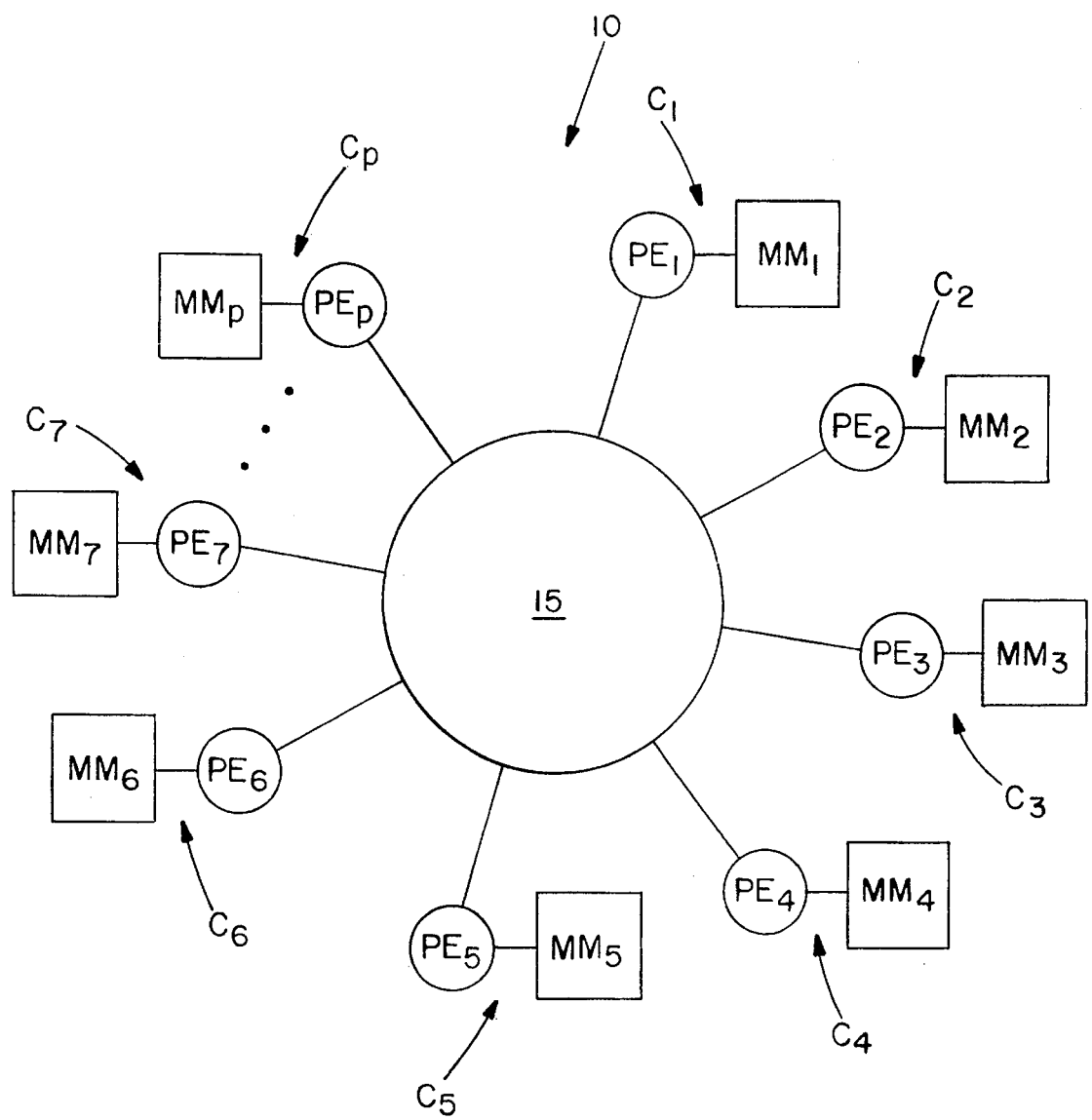
FIG. 1 is a schematic block diagram of a parallel computer system.

FIG. 1 is a schematic block diagram of a parallel computer system consisting of p components $C_1$–$C_p$. As shown, the components $C_1$–$C_p$ are arranged as nodes on a computer network 10 having a distribution system 15, such as a router. However, other parallel computer architectures may be employed without affecting preferred embodiments of the invention. Each of the components $C_1$–$C_p$ has some memory capability, which may be in a respective memory module $MM_1$–$MM_p$, and some processing capabilities in a respective processing element $PE_1$–$PE_p$. Distinct components contain disjoint memory addresses. Memory and processing capability may not be uniformly distributed among the components $C_1$–$C_p$. For example, the processing capability of a destination component may be only that required to access memory. Each component is addressed by a unique component identifier.

The invention efficiently routes arbitrary patterns of concurrency among the components $C_1$–$C_p$. In a parallel computing system, a component may be a destination for a plurality of requests originating from at least one other component. In a typical routing system, the destination component must process each request individually. In a preferred embodiment of the invention, the requests destined for the destination component are dynamically divided into subgroups of requests. The subgroups of requests are preprocessed by at least one intermediate component.

Each intermediate component combines requests into combined requests. The combined requests from the intermediate components may be further grouped and combined into a further combined request by further intermediate components. After the requests are sufficiently combined by intermediate components, the combined requests are processed by the destination component. The number of combining layers is dependent on a basis sequence, which may be supplied by the user.

Briefly, the basis sequence is a sequence of integers, the product of the integers in the sequence must equal the number of components on the system. The number of integers in the basis sequence defines the number of phases in the combining method. A typical parallel processor routing system does not perform any combining and is considered to be single-phase system. A single-phase system is represented by a single integer basis sequence. A preferred embodiment of the invention performs multiple-phase combining. In a multiple-phase system, there are at least two integers in the basis sequence. In addition to defining the number of phases, the basis sequence also defines the number of components in each phase that may serve as intermediate components for any one destination address.

In a preferred embodiment of the invention, a hashing function is used to hash the destination address to a component identifier. The identifiers of the $i^{th}$-phase intermediate components are derived from the hashed destination address based on the product of the first through $i^{th}$ integers in the basis sequence. That product is used to determine the high order portion of the intermediate component identifier. In a preferred embodiment of the invention, the integers in the basis sequence are powers of 2 to provide for a simple method of implementation. The remaining lower portion of the intermediate component identifier is randomly determined. In a preferred embodiment of the invention, the random portion of the component identifier is calculated by a pseudo-random number generator. As intermediate components are selected at each phase, the component identifier converges to the identifier of the destination component. In other words, the hashed portion of the identifier tends to converge the requests toward the destination component and the randomized portion of the identifier tends to spread the request processing among the set of intermediate components that are consistent with the hashed higher order portion of the identifier. In an alternative preferred embodiment, the lower portion of the intermediate component identifier is determined not purely randomly but as a function of the source address.

Theory

Figure 2A:
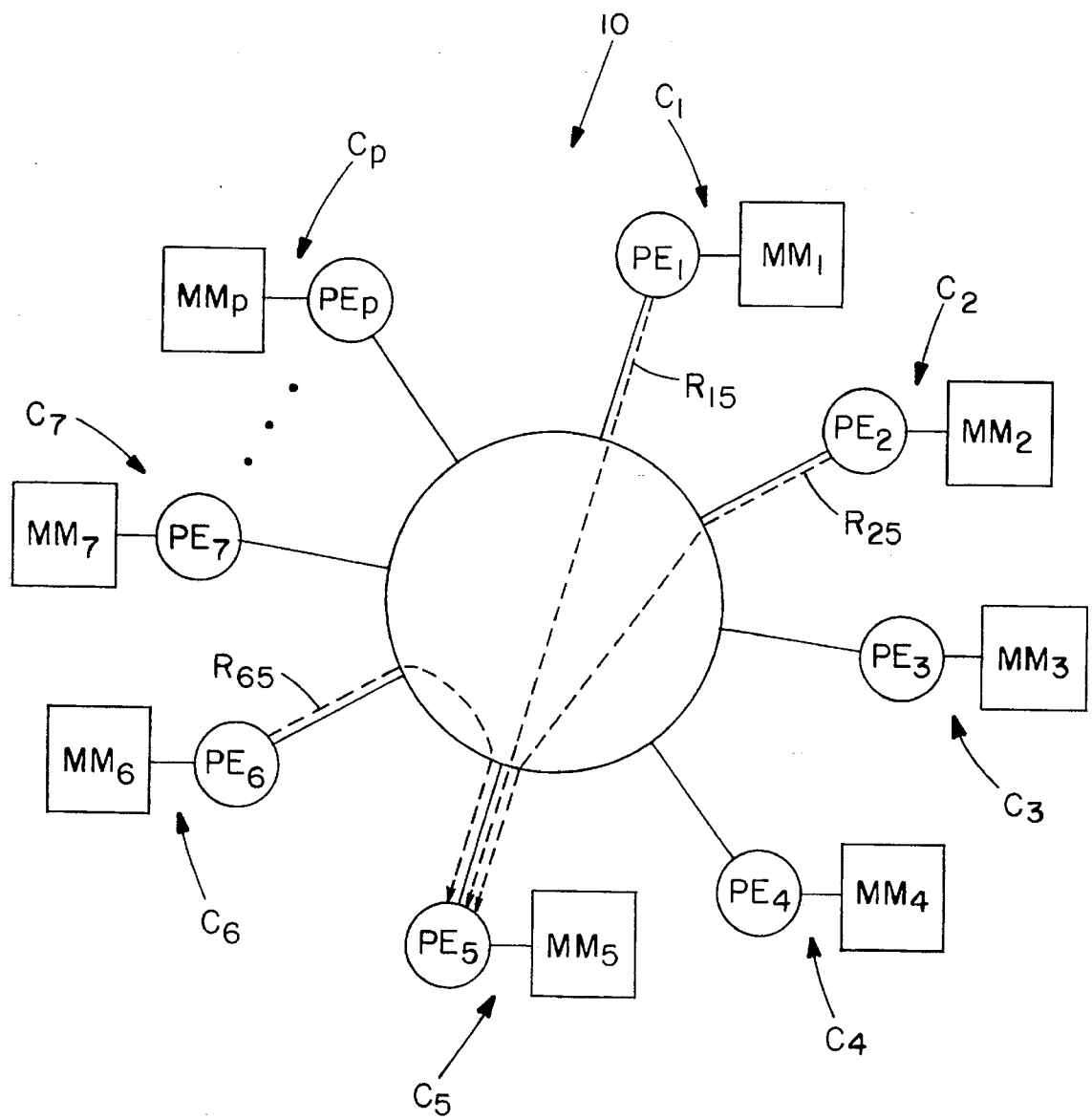
FIGS. 2a–b illustrate example request patterns among the components.
Figure 2B:
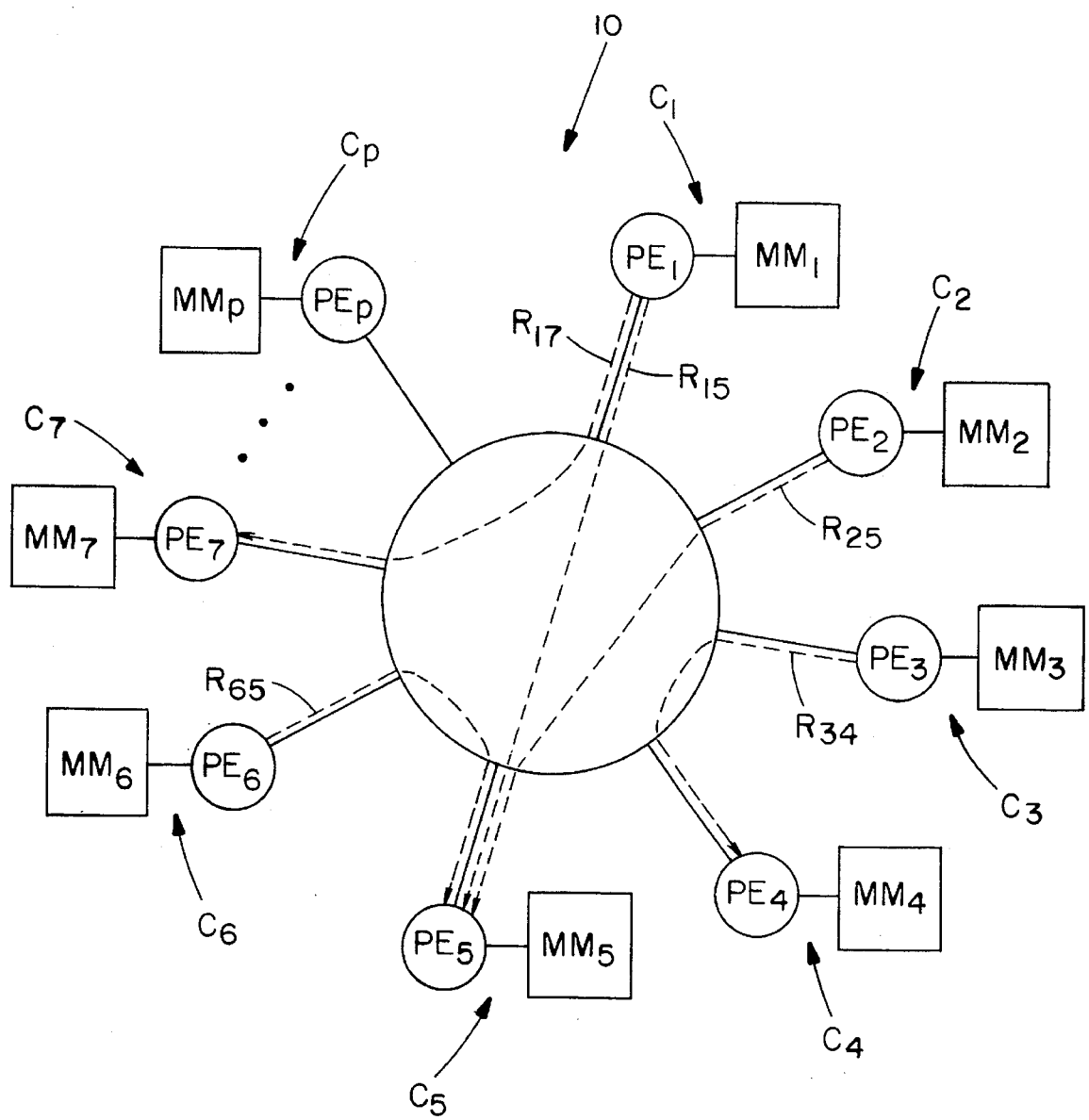

FIG. 2a–b illustrate example request patterns among the components $C_1$–$C_p$. A (q,r)-pattern among the p components is a set of communication requests in which each component sends at most q requests, each request has a destination that is a memory address in a particular component, and at most r requests are addressed to any one component. Several requests may share the same address (and therefore by implication also the same component). Referring to FIG. 2a, components $C_1$, $C_2$ and $C_6$ are each shown (by dashed lines) sending a single respective request $R_{15}$, $R_{25}$ and $R_{65}$ referencing an address in component $C_5$. Thus, FIG. 2a illustrates a (1,3)-pattern among the p processors. Referring to the more complex request pattern of FIG. 2b, components $C_1$, $C_2$ and $C_6$ are each shown (by dashed lines) sending a single respective request $R_{15}$, $R_{25}$ and $R_{65}$ referencing an address in component $C_5$, component $C_1$ is shown sending a request $R_{17}$ referencing an address in component $C_7$, and component $C_3$ is shown sending a request $R_{34}$ referencing an address in component $C_4$. Thus, FIG. 2b illustrates a (2,3)-pattern among the p components.

The set of requests sharing the same address is called a group. The degree of a request is the number of elements in the request's group, and the degree of the pattern is the maximum degree of the pattern's elements. Thus, if the pattern consists of n groups, of respective sizes $d_1, \ldots, d_n$ and destinations $t_1, \ldots, t_n$, then the degree of the pattern is defined by the equation $$d = \max\{d_1, \ldots, d_n\} \quad (1)$$

Although various alternatives may be considered, in the analysis of a preferred embodiment, a charge of max{q,r} units is made for executing directly a (q,r)-pattern on a router. Thus, the request patterns illustrated in FIGS. 2a–c have a cost of 3. This charging policy is suggested by the BSP model and implies, in general, that max{q,r} is large enough that any latency in the router is hidden by pipelining and any startup costs are amortized.

A preferred multi-phase combining system implements patterns of high degree by dynamically decomposing the patterns into a sequence of patterns of low degree, with no programmer intervention other than possibly the setting of the basis sequence. In each phase at each component, the requests having the same destination address that arrive at the component are combined into a single request in the phase to follow. For example, if every processor $PE_1$–$PE_p$ wishes to read the same word in memory then the requests form a (1,p)-pattern consisting of a single group, and has degree p. If implemented directly, the charging policy would charge the request p units of time. The request can be decomposed, however, into two $(1,\sqrt{p})$-patterns, each costing $\sqrt{p}$ units. The first pattern allows each of $\sqrt{p}$ sets of $\sqrt{p}$ requests to converge to a separate component. The second pattern sends the $\sqrt{p}$ requests, each formed from one of these sets, to their common destination. For simplicity and clarity of description, it is assumed that any two requests to the same destination address are combinable. This assumption is true if, for example, the computer is executing at any one time either read or write statements, but not both. It is understood that the analysis can be easily extended to cases in which more than one species of request cohabit.

A preferred embodiment of a multi-phase method for implementing arbitrary patterns on a simple router efficiently is described below. Many variants with comparable performance are possible.

A preferred embodiment of an m-phase combining system has a basis sequence $(b_1, \ldots, b_m)$ of integers such that $$\prod_{i=1}^{m} b_i = p. \quad (2)$$

The space of possible addresses is denoted by M and the components sequentially numbered $\{0, \ldots, p-1\}$. In addition, $\{h_1, \ldots, h_m\}$ are hash functions where $h_i: M \rightarrow \{0, \ldots, b_1 \ldots b_i-1\}$. The hash functions may be different for different phases or the hash functions may have some commonality. As long as the hash functions are efficient to compute, they do not require anything in common. In addition, $\{k_1, \ldots, k_{m-1}\}$ are random functions where $k_i: \Phi \rightarrow \{0, \ldots, (b_{i+1} \ldots b_m)-1\}$.

For each pattern the hash functions $h_i$ are chosen once, possibly randomly from certain sets of hash functions, while the random functions $k_i$ have values that are independently chosen randomly at each invocation and do not depend on any argument. The $i^{th}$ phase of the method, at each component, combines into one request all pending requests to any one destination address $t_j$ and send the combined request to component $h_i(t_j)(b_{i+1} \ldots b_m)+k_i$. Note again that the requests to the same $t_j$ have the same value of $h_i(t_j)$, but $k_i$ is chosen randomly and independently for each of them at each component. It can be easily verified that, after i phases, among the requests destined for any $t_j$, sets of up to $b_1 \ldots b_i$ may have been combined into one request. Also, if i<m, the resulting requests have been scattered randomly over $b_{i+1} \ldots b_m$ components, whose identities are determined by the hash function $h_i$. In particular, after the last phase, the request destined for $t_j$ has been delivered to the hashed identifier $h_m(t_j)$.

It may not be necessary to hash after the first phase to avoid overly active components. In that case, bits from the actual destination component identifier could be substituted in the intermediate component identifiers instead of further hashed bits. In a generic router, the destination address is hashed at each phase.

The most promising mechanisms known for simulating a shared memory, Parallel Random-Access Machines (PRAM) or BSP model on multiprocessor machines, use a hashed address space. Hence, the method as described implements hashing exactly as required in that context. However, the method can be adapted easily to deliver to actual component identifiers rather than hashing the destination addresses.

A variant of a preferred embodiment is obtained by replacing the random function $k_i$ above by a function $k_i^*$ that maps $\{0, \ldots, p-1\}$ to $\{0, \ldots, b_{i+1} \ldots b_m-1\}$ and is defined as $k_i^*(s) = s \bmod b_{i+1} \ldots b_m$. Then in the $i^{th}$ phase, a request originating at source component s and destined for address $t_j$ is sent to component $h_i(t_j)b_{i+1} \ldots b_m+k_i^*(s)$.

Asymptotic Analysis

A property of the multi-phase method that holds asymptotically as the number of processors $p \to \infty$ is that for any constant $\epsilon > 0$, any integer $m \geq 1 + \lfloor \epsilon^{-1} \rfloor$, and any constant $\delta > 0$, there is an m-phase algorithm that can realize any (q,r)-pattern with $q \leq p^\epsilon$ in a number of steps that exceeds $(1+\delta)mp^\epsilon$ with probability less than $e^{-\Omega(p^{\epsilon-1/m})}$.

The asymptotical property assumes that the address space is hashed, as previously described, and for that reason does not depend on r. Also, the proof assumes that hash functions are chosen from a set of functions that effectively allows the chosen function to behave randomly and independently for the various arguments at which it is evaluated.

The asymptotical property, as stated, improves on the constant multiplier in the run time of the best previously known method based on integer sorting. In particular, experimental results show that small values of $\delta$ can be attained with overwhelming probability.

The analysis uses the following bound on the tail of the sum of independent random variables. If $\xi_1, \ldots, \xi_n$ are independent random variables each taking values in the range [0,1] such that the expectation of their sum is E, then for any $\delta > 0$, $$\text{Prob}\left(\sum_{i=1}^{n} \xi_i \geq (1+\delta)E\right) \leq \left(\frac{e^\delta}{(1+\delta)^{1+\delta}}\right)^E. \quad (3)$$

In the analysis it is assumed, for simplicity, that $b = p^{1/m}$ is an integer. The basis sequence chosen for analysis is $(b_1, b_2, \ldots, b_m)$, where $b_1 = b_2 = \ldots = b_m = b$. The behavior of the method on an arbitrary (q,r)-pattern with $q \leq p^\epsilon$, and with n destination addresses $t_1, \ldots, t_n$ and degrees $d_1, \ldots, d_n$, respectively, will be considered. If $$v = \sum_{i=1}^{n} d_i,$$

then $v \leq qp \leq p^{1+\epsilon}$.

At the start of phase i, the $j^{th}$ group of requests, namely those destined for $t_j$, are combined into at most $$\min\left\{d_j, \frac{p}{b^{i-1}}\right\} \quad (4)$$

requests. For i>1, these requests are distributed randomly among the $p/b^{i-1}$ components numbered $h_{i-1}(t_j)b^{m-i+1}+x$ for $0 \leq x < b^{m-i+1}$.

Now consider some fixed component numbered $yb^{m-1}+z$ where $0 \leq y < b^i$ and $0 \leq z < b^{m-i}$. Let $\eta_j$ be the number of requests with destination $t_j$ arriving at this component at the end of phase i. Then, $$\text{Prob}(\eta_j \geq u) \leq \text{Prob}(h_i(t_j)=y) \cdot B\left(\min\left\{d_j, \frac{p}{b^{i-1}}\right\}, \frac{b^i}{p}, u\right) \quad (5)$$

where B(w,P,u) denotes the probability that in w independent Bernoulli trials, each with probability P of success, there are at least u successes. The first term gives the probability that the randomly chosen hash function $h_i$ maps $t_j$ to y, and equals $b^{-i}$. The second term bounds the probability that at least u of the requests are mapped by the invocations of the random function $k_i$, to the chosen value of z, and, by Equation 3, can be upper bounded by $$\left(\frac{e^\delta}{(1+\delta)^{1+\delta}}\right)^b \leq e^{-\Omega(p^{1/m})} \quad (6)$$

if $u=(1+\delta)b$ and $\delta>0$, because the mean is at most $(p/b^{i-1})(b^i/p)=b$.

New random variables $\xi_1, \ldots, \xi_n$ are defined, where $$\xi_j = \begin{cases} \eta_j/((1+\delta)b) & \text{if } \eta_j < (1+\delta)b, \\ 1 & \text{otherwise.} \end{cases} \quad (7)$$

These random variables satisfy the condition of Equation 3 that $0 \leq \xi_j \leq 1$, and model the behavior of $\eta_1, \ldots, \eta_n$ exactly, except for the range $\eta_j \geq (1+\delta)b$, which is a very rare event. Because the expected value of $\eta_j$ is at most $$b^{-1} \cdot \min\left\{d_j, \frac{p}{b^{i-1}}\right\} \cdot \frac{b^i}{p},$$

it follows from the definition of $\xi_j$ that the sum of the expectations of $\xi_1, \ldots, \xi_n$ is $$\begin{aligned} E &\leq \frac{1}{(1+\delta)b} \sum_{j=1}^{n} \frac{d_j}{p} \quad (8) \\ &\leq \frac{p^{1+\epsilon}}{(1+\delta)bp} \\ &\leq \frac{p^{\epsilon-1/m}}{(1+\delta)}. \end{aligned}$$

Applying Equation 3 to $\xi_1, \ldots, \xi_n$ gives that $$\begin{aligned} \text{Prob}\left(\sum_{j=1}^{n} \xi_j \geq (1+\delta) \cdot \frac{p^{\epsilon-1/m}}{(1+\delta)}\right) \quad &(9) \\ \leq \left(\frac{e^\delta}{(1+\delta)^{1+\delta}}\right)^{\frac{p^{\epsilon-1/m}}{1+\delta}} \\ \leq e^{-\Omega(p^{\epsilon-1/m})} \end{aligned}$$

if $\delta>0$. However, by the definition of $\xi_j$, the left-hand side is $$\text{Prob}\left(\sum_{j=1}^{n}\eta_j \geq (1+\delta)p^\epsilon\right) - \sum_{j=1}^{n}\mu_j \qquad (10)$$

where $\mu_j$ is less than the probability that $\eta_j$ exceeds $(1+\delta)b$, which by Equations 5 and 6 is at most $e^{-\Omega(p^{1/m})}$. Hence, from Equations 9 and 10, the probability that the number of requests $$\sum_{j=1}^{n}\eta_j$$

arriving at the chosen node at the end of phase i exceeds $(1+\delta)p^\epsilon$ is still $e^{-\Omega(p^{\epsilon-1/m})}$, because $n \leq p^{1+\epsilon}$.

Because there are p components and m phases, the probability that this charge is exceeded anywhere in the run is therefore pm times this same quantity, which is also $e^{-\Omega(p^{\epsilon-1/m})}$. Hence, the asymptotical property claimed follows.

For completeness, the same result will now be proved for a variant preferred embodiment in which requests at phase i, originating at source component s and destined for address $t_j$ are sent to component $h_i(t_j)b^{m-i}+k_i^*(s)$ where $k_i^*(s)=s \mod b^{m-i}$. Here, at the start of phase i, the group of requests destined for $t_j$ are combined into at most $\min\{d_j, b^{m-i+1}\}$ requests, which are distributed among the $b^{m-i+1}$ components numbered $h_{i-1}(t_j)b^{m-i+1}+x$ for $0 \leq x \leq b^{m-i+1}$, but now not randomly. For any fixed component $yb^{m-i}+z$ where $0 \leq y < b^i$ and $0 \leq z < b^{m-i}$, $\eta_j$ is defined to be the number of requests with destination $t_j$ arriving at this component at the end of phase i. Let $X_j$ be the number of requests at the start of phase i destined for $t_j$ from component identifier s with $k_i^*(s)=z$. Then $X_j \leq b$ and $\Sigma X_j \leq p^\epsilon b^i$. Also, $\Theta_j = X_j$ with probability $b^{-i}$ (i.e., if $h_i(t_j)=y$), and $\eta j=0$, otherwise. If $\xi_j=\eta_j/b$, then the sum of the expectations of $\xi_j$ is $E \leq b^{-i-1}\Sigma X_j \leq b^{-i-1}p^{\epsilon bi} \leq p^{\epsilon-1/m}$. The result then follows by applying Equation 3.

Implementation

Figure 3:
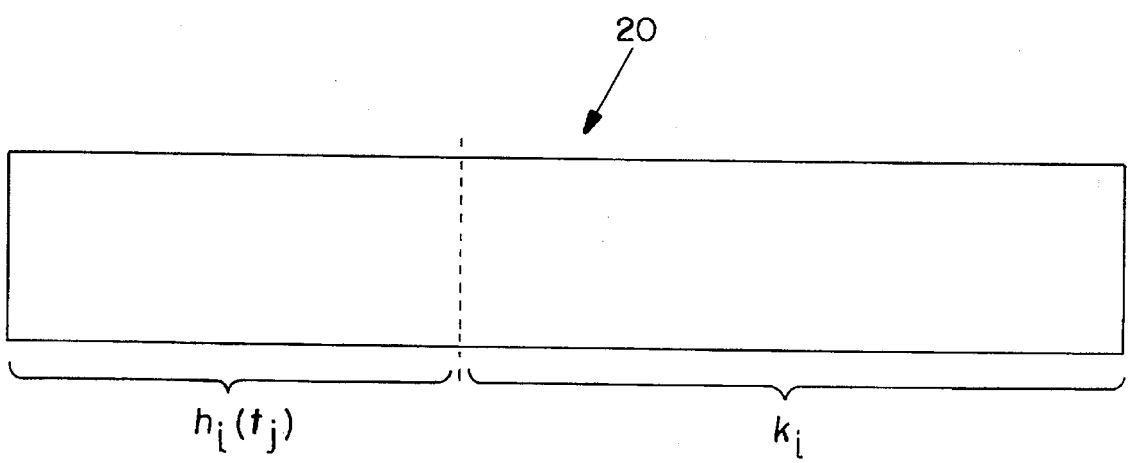
FIG. 3 illustrates an allocation of bits in an address.

A preferred multiple-phase combining method is implemented as described below. In the basis sequence only powers of 2 are used (i.e. $b_i=2^{a_i}$ for integers $a_i$, $1 \leq i \leq m$). A pseudo-random number generator generates values of the random functions $k_i$ at each invocation. Hash functions $h_1, \ldots, h_m$ generate for each pattern the set of values $\{h_i(t_j)|1 \leq i \leq m, 1 \leq j \leq n\}$. In particular, the binary representation of $h_i(t_j)$ is the prefix of the binary representation of $h_{i+1}(t_j)$, so that only $a_{i+1}$ random new bits are chosen when determining the latter. FIG. 3 illustrates the bit allocation for a component identifier 20 during phase i.

Figure 4A:
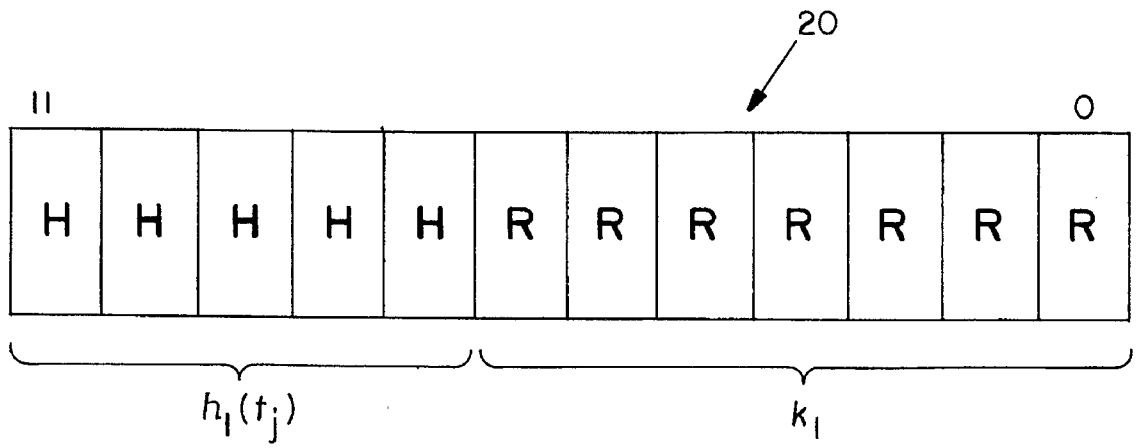
FIGS. 4a–c illustrate the effect of hashing and randomization on the destination address of FIG. 3.
Figure 4B:
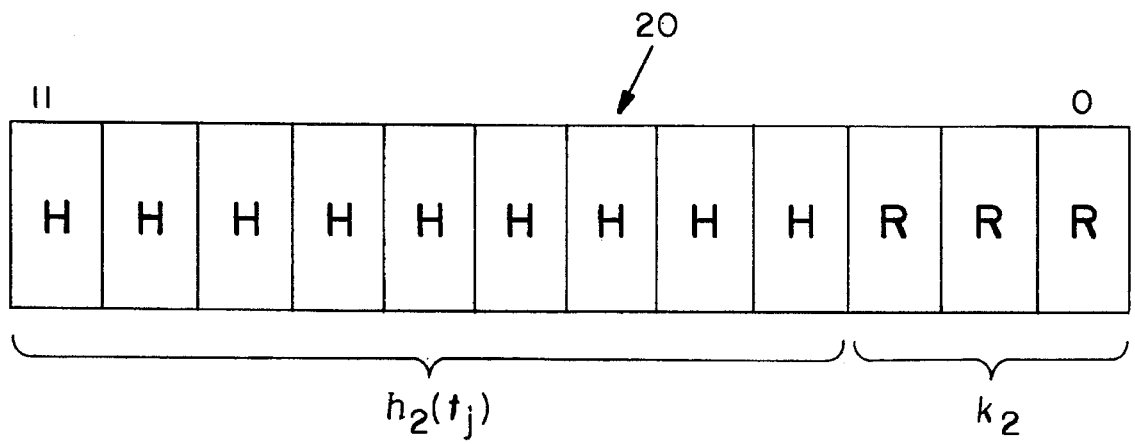
Figure 4C:
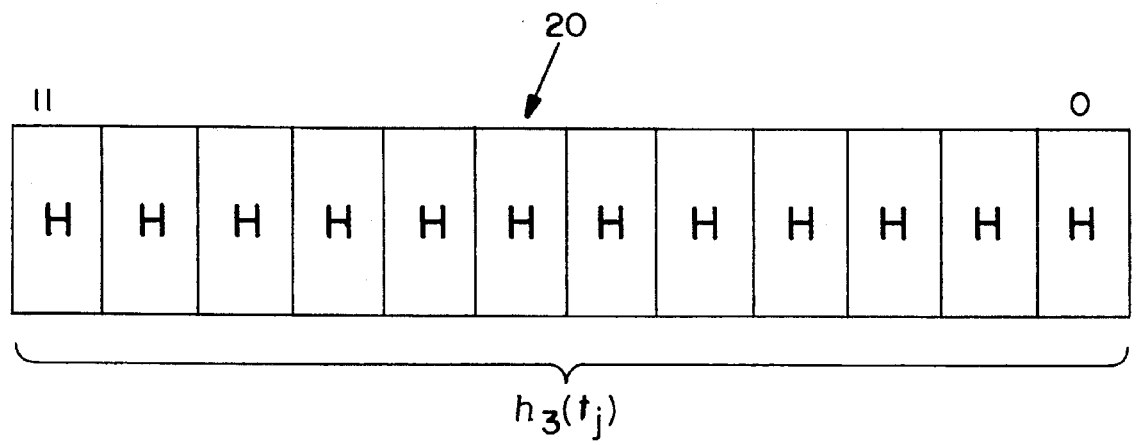

By grouping together requests to a destination node at intermediate nodes, the number of requests received and processed by the destination node is reduced. The combining is similar in all phases, except that the first phase combines original requests and subsequent phases combine previously combined requests. The effects of the hashing function and randomization on an identifier is illustrated in FIGS. 4a–c. Each request is tagged with a final destination address. For the description of FIGS. 4a–c, assume that $p=2^{12}$ and the basis sequence is (32,16,8). Thus, there are 12 component identifier bits as shown in FIGS. 4a–c.

FIG. 4a illustrates the first phase. The hashing function hashes the destination address $t_j$ to $h_1(t_j)$. The hashed address is then multiplied by the quantity $b_2b_3=16*8=128$, which offsets the hashed address to occupy the highest 5 bits of the component identifier. The remaining lowest 7 bits of the component identifier are randomized by a pseudo-random number generator so that a random choice among 128 possible components will be made. At the intermediate components reached at the end of the first phase, groups of requests are combined into fewer requests.

For the second phase, shown in FIG. 4b, the hashed portion of the component identifier consumes more bits, while the random portion consumes fewer bits. The hashing function hashes the destination address $t_j$ to $h_2(t_j)$. The hashed address is then multiplied by the quantity $b_3=8$, which offsets the hashed address to occupy the highest 9 bits of the component identifier. The remaining lowest 3 bits of the component identifier are randomized by a pseudo-random number generator to effect a random choice among 8 possible components. At the intermediate components reached at the end of the second phase, groups of combined requests are combined into fewer requests.

For the third phase, shown in FIG. 4c, the entire component identifier is hashed to $h_3(t_j)$, there are no random bits. If the address space itself is hashed according to $h_3$, the operation is complete. Otherwise, a final phase of routing involving no combining will follow. In an alternative embodiment, the last phase may set the identifier of the destination component directly, without hashing. At the final phase, the combined requests will arrive at the destination component, where the destination address within the component is operated on according to the received combined requests.

Figure 5:
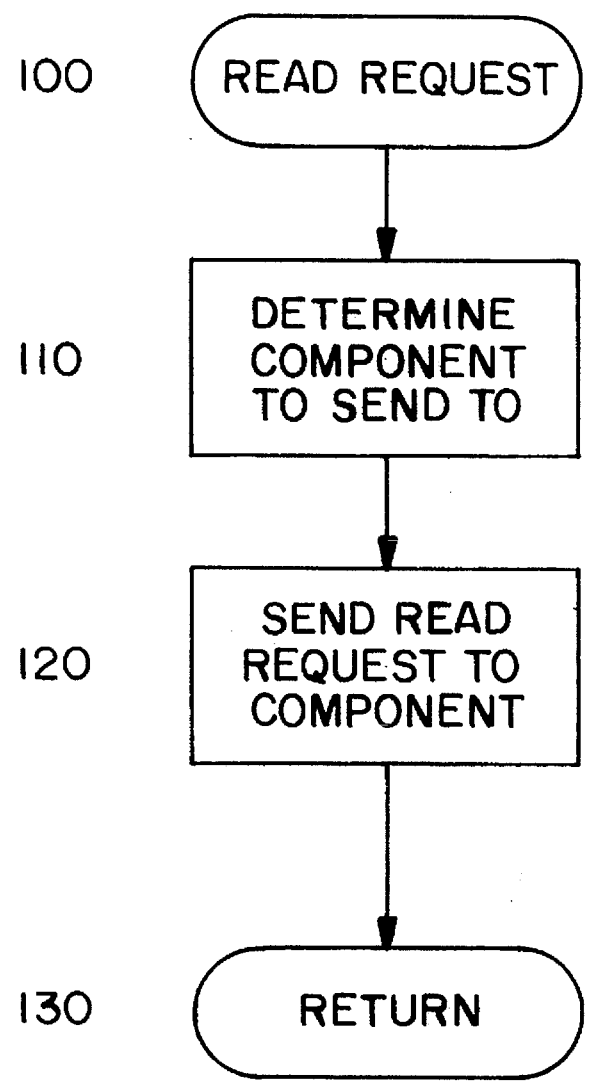
FIG. 5 is a flowchart for initiating a read request at a component of FIG. 1.
Figure 6:
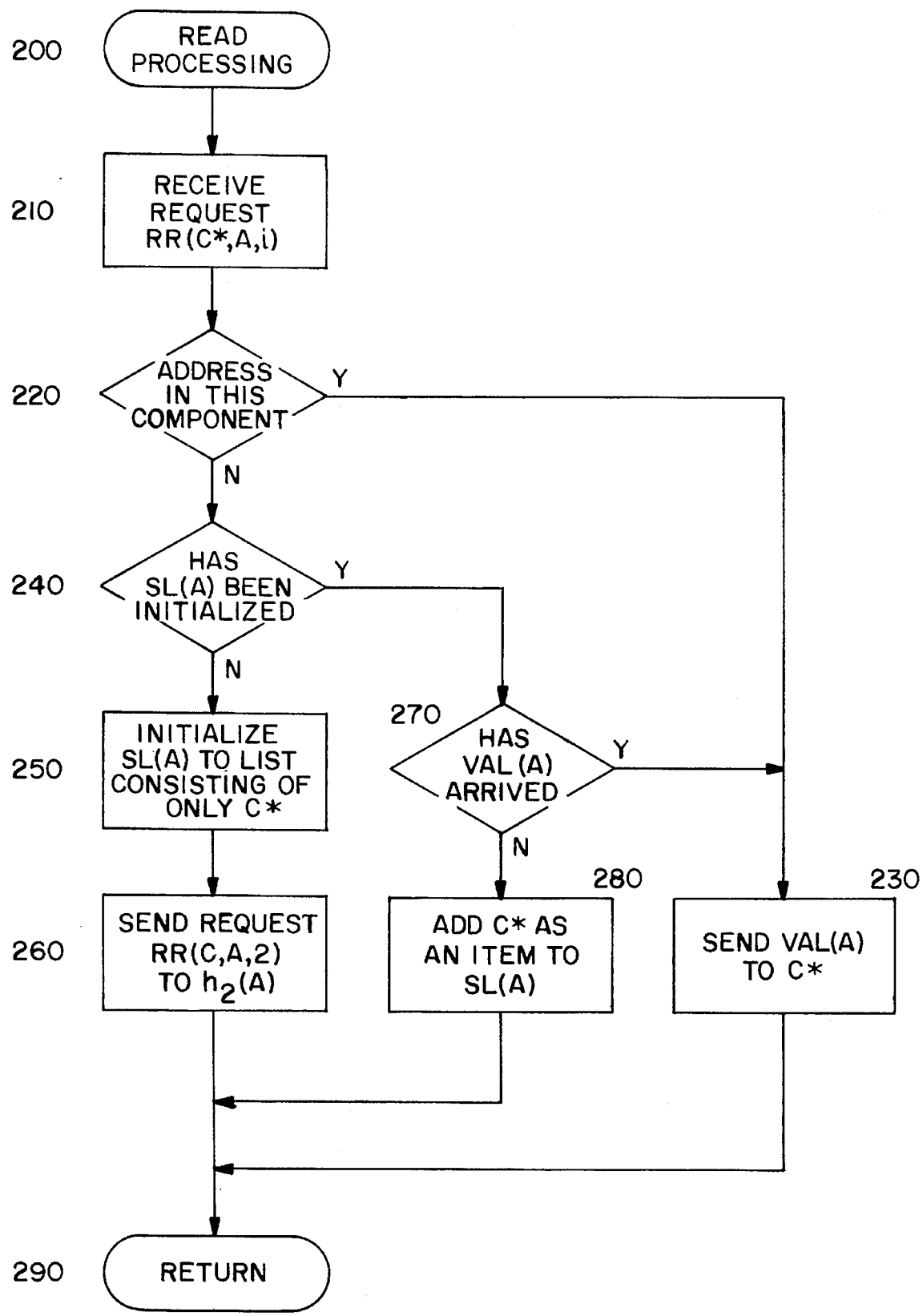
FIG. 6 is a flowchart for processing read requests at a component of FIG. 1.

A preferred embodiment for implementing concurrent read operations for a component C is shown by the flowcharts of FIGS. 5 and 6. This implementation is asynchronous in that some operation of one phase can start before all the operations of the previous phase have completed. Each component C can issue read requests of the form RR(C,A,i), which means that the contents of address A needs to be read and passed back to component C, and where i is the number of the current phase. Val(A) denotes a message containing the returned values of address A. SL(A) is a list containing the components to which this value has to be sent by component C once received.

Each component C must be able to perform four separate functions in a read operation. Namely, 1) initiating read requests;

2) responding to the read request if address A is located in component C;

3) acting as a relay station for duplicating and passing back Vat(A) if component C is an intermediate node in the process; and 4) combining the read requests as they converge to address A, again if C is an intermediate node.

These functions will be described below in terms of flowcharts.

FIG. 5 is a flowchart for initiating a read request at component C. For simplicity and clarity of description, two phases are used and the address space is hashed. Also, $p=b_1b_2$ is the number of components and the two phases have basis sequence $(b_1,2)$. The implementation assumes address A is a physical address located at hashed address $h_2(A)$ and $h_1$ is a function mapping the address space to $\{0,1,\ldots,b_1-1\}$. The implementation is asynchronous in the sense that requests to an address A passing through component C are forwarded immediately to become phase 2 requests before all the phase 1 messages have necessarily combined. Also, Val(A) it passed back as soon as possible. The nomenclature [[a, ... ,b]] used in the flowcharts is defined as being a pseudo-random integer in the range [, ... ,b].

The read request is initiated at step 100. At step 110, the component to send the request to is determined according to the identifier formula previously discussed. For convenience the formula is repeated here as $h_i(t_j)(b_{i-1} \ldots b_m)+k_i$.

Substituting A for $t_j$ in a two phase system gives the component identifier as $h_1(A)b_2+[[0, \ldots, b_2-1]]$. At step 120, the read request RR(C,A,1) is sent to the component determined in step 110. Control returns to the routine at step 130.

FIG. 6 is a flowchart for responding to and combining requests at component C. Processing is initiated at step 200. The component receives a request at step 210. A read request will be of the form RR(C*,A,i), where C* is the requesting component. The address A from the request is checked at step 220. If the address A is in the component C, then processing is transferred to step 230. At step 230, the value in the address Val(A) is sent to the requesting component C*. Control then returns to the calling routine at step 290.

Returning to step 220, if the address A is not in the component C, then the list SL(A) is checked at step 240. If SL(A) has not been initialized, then SL(A) is initialized at step 250 to contain a single item, namely requesting component C*. After the list is initialized, a request is sent to $h_2(A)$ at step 260. After sending the request, control returns to the calling routine at step 290.

If SL(A) has been initialized, it will contain a list of components to which to send the value Vat(A). If SL(A) has been initialized, then the component C checks (at step 270) to determine whether the value Val(A) has arrived back at this component yet. If Val(A) has arrived at component C, then at step 230 the value Val(A) is sent back to component C*. If Val(A) has not arrived, then component C* is added as an item to SL(A) at step 280. After Val(A) is passed back or component C* is added to the list, control returns to the calling routine at step 290.

Figure 7:
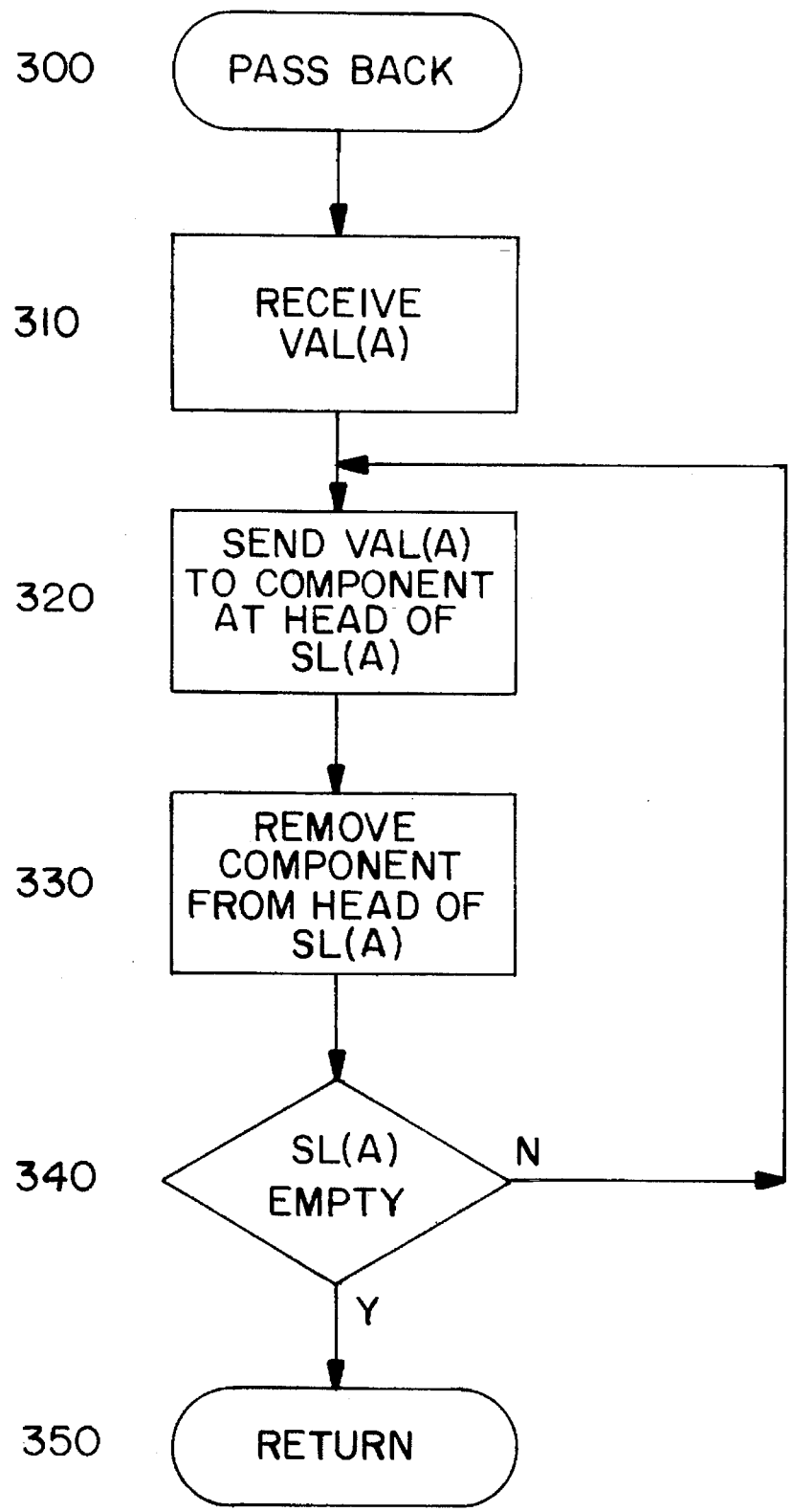
FIG. 7 is a flowchart for passing back values read from a component to another component of FIG. 1.

FIG. 7 is a flowchart for passing back values read from a component C to another component. Processing is initiated at step 300. The component receives the value to pass back, Val(A), at step 310. At step 320, Val(A) is sent to the component identified at the head of the SL(A) list. After the value is sent, the component at the head of the SL(A) list is removed at step 330. The list SL(A) is checked at step 340 to determine if the list is empty. If the step 330 removal does not empty the SL(A) list, then processing continues at step 320 with the new head of the list being sent the value Val(A). Once the step 330 removal empties the SL(A) list, processing returns to the calling routine at step 350.

Figure 8:
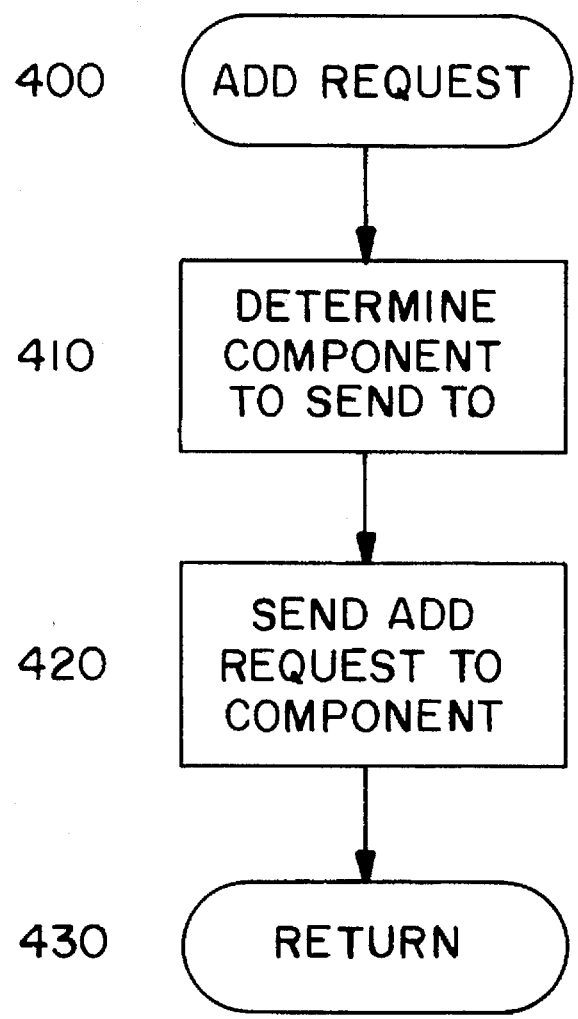
FIG. 8 is a flowchart for initiating an addition request at a component of FIG. 1.
Figure 9:
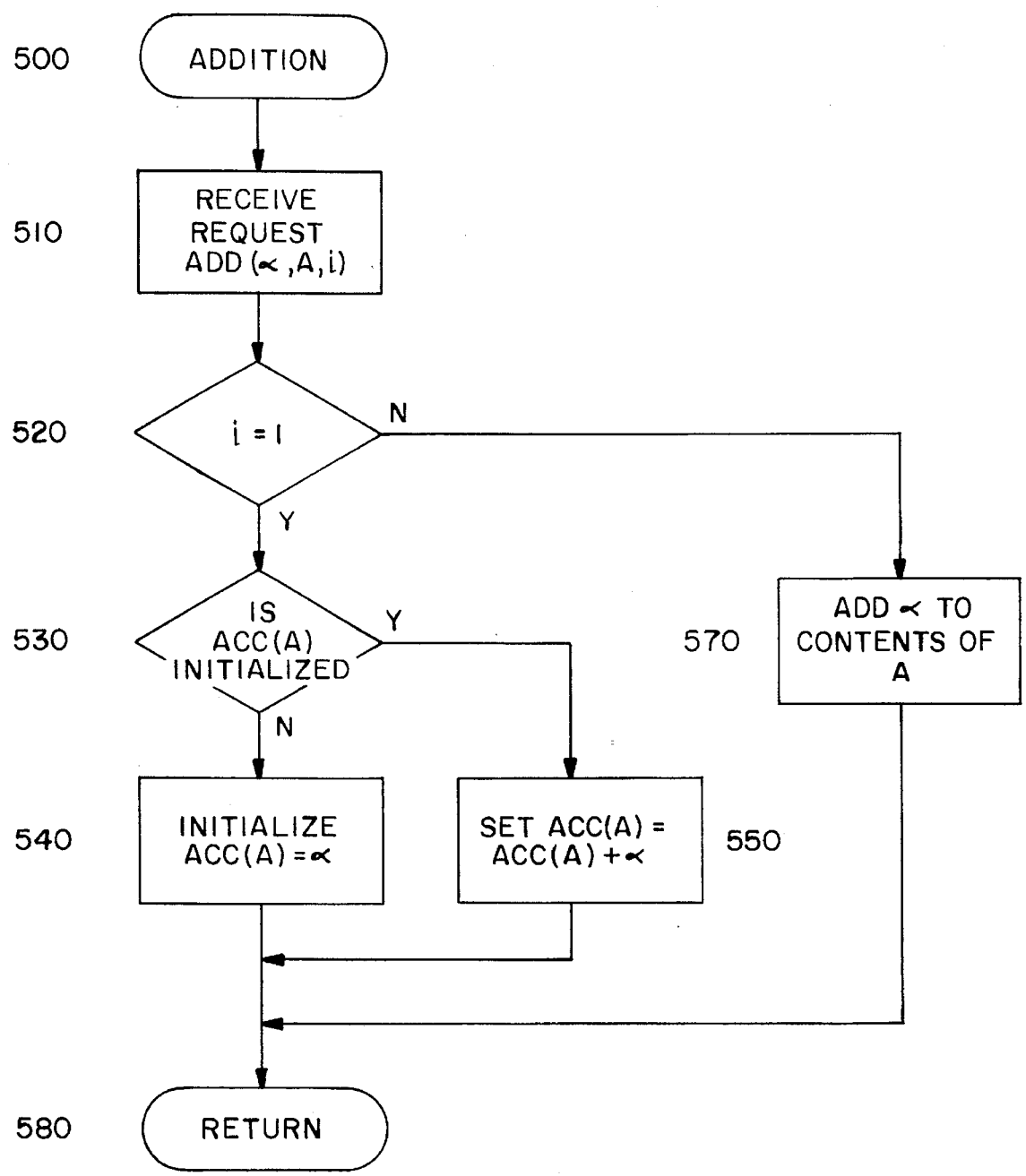
FIG. 9 is a flowchart for processing addition requests at a component of FIG. 1.
Figure 10:
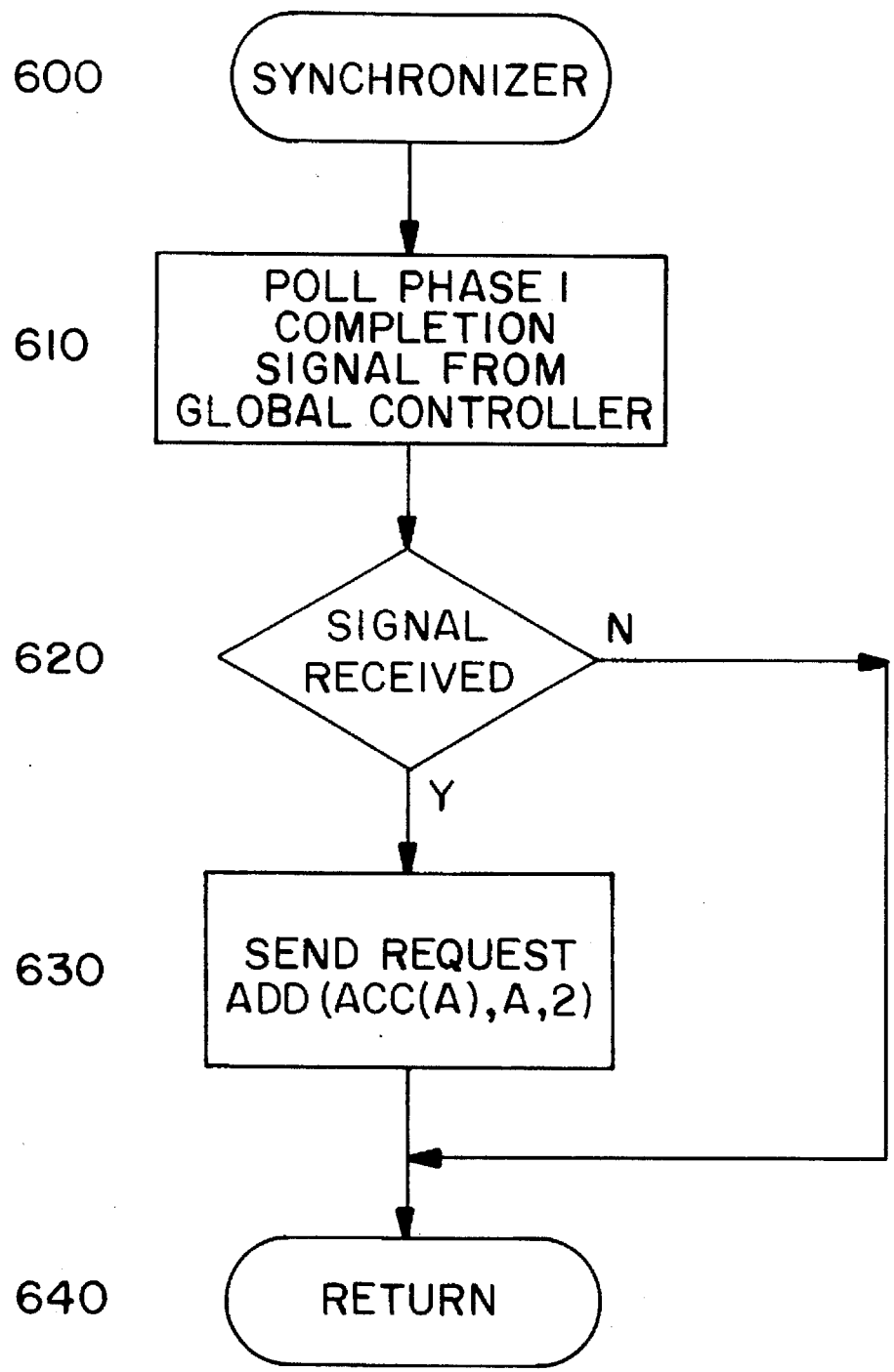
FIG. 10 is a flowchart for initiating a subsequent addition request after all preceding phase requests have been delivered.

A preferred embodiment for implementing multi-phase combining for a component C where the combining operation is addition is shown by the flowcharts of FIGS. 8, 9 and 10. Each component $C_1$-$C_p$ can issue a request ADD($\alpha$,A,i), the desired outcome of which is to add the value of $\alpha$ to the contents of address A. The parameter i denotes the phase that the request is passing through.

Each component C must be able to perform three separate functions in an addition operation. Namely:

1) issuing an addition request;

2) responding to an addition request if the address A is located in the component C; and 3) combining the addition requests if the component C is an intermediate node in the process. These addition functions will be described below in terms of flowcharts.

For simplicity and clarity of description, two phases are used and the address space is not hashed. Also, $p=b_1b_2$ is the number of components and the two phases have basis sequence ($b_1,b_2$). The implementation assumes that address A is a physical address and $h_1$ is a hash function mapping the address space to $\{0,1, \ldots, b_1\}$. Hashing is used only at the end of the first phase. The implementation is synchronous in the sense that all requests in the first phase must finish before the second phase starts. The nomenclature [[a, ... ,b]] used in describing the flowcharts is defined as being a pseudo-random integer in the range [a, ... ,b].

FIG. 8 is a flowchart for initiating an addition request at component C. The addition request is initiated at step 400. At step 410, the component to send the request to is determined according to the identifier formula previously discussed. For convenience the formula is repeated here as $h_i(t_j)(b_{i+1} \ldots b_m)+k_i$. Substituting A for $t_j$ in a two phase system gives the component identifier as $h_1(A)b_2+[[0, \ldots, b_2-1]]$. At step 420, the addition request ADD($\alpha$,A,1) is sent to the component determined in step 410. Control returns to the calling routine at step 430.

FIG. 9 is a flowchart illustrating the processing and combining of addition requests received in component C. Processing is initiated at step 500. The component C receives a request at step 510. An addition request will be of the form ADD($\alpha$,A,i), where $\alpha$ is the value to be added to the value in address A. The phase i is checked at step 520. In a two phase implementation, i will either equal 1 for the first phase or 2 for the second phase. If the request is a first phase request (i=1), then processing continues to step 530, where an accumulator, ACC(A), is checked for initialization. If the accumulator has not been initialized, then ACC(A) is set to the value of $\alpha$ at step 540. If the accumulator has already been initialized, then the value of $\alpha$ is added to the value of ACC(A) at step 550. Finally, processing returns to the calling routine at step 580.

If the request is a second phase request (i=2), then the address A must be located in the processing component C. At step 570, the value of $\alpha$ from the request is added to the value at address A. The value of $\alpha$ may be the value of ACC(A) from intermediate components. Processing then returns to the calling routine at step 580.

Unlike the case of read requests, for implementing addition the whole system should be synchronized. The value of ACC(A) is forwarded to A only when all phase 1 requests have arrived at C. FIG. 10 illustrates the issuance of request ADD (ACC(A),A,2) by C, that is prompted when a global check by a global controller confirms that phase 1 has been completed. When phase 1 has completed then the component C receives a completion signal from the global controller. Processing is initiated at step 600. At step 610, the component C polls for the phase 1 completion signal. The status of the completion signal is checked at step 620. If a completion signal has been received, then the component sends the request ADD(ACC(A),A,2) to the second phase component at step 630. Once the request is sent or if the completion signal has not been received, then processing returns to the calling routine at step 640.

Various experimental results are shown in the following tables for a preferred embodiment that uses random $k_i$ functions and that synchronizes the phases. The tables consider cases where $p=2^{12}$ and $$v = \sum_{j=1}^{n} d_j = 2^{17},$$

with patterns having q=32, but with degrees varying from $2^{12}$ down to 1. Thus, typically there would be $n=2^{17}/d$ groups each of degree d for $d=2^{12},2^{11}, \ldots ,2^0$. Table I provides performance factors for basis sequence (4096) (i.e. one-phase) for various degrees for $p=2^{12}$ and $v=2^{17}$. Table II provides performance factors for various basis sequences for various degrees for $p=2^{12}$ and $v=2^{17}$. The factors are given separately for each phase, as well as in total. Table III provides performance factors for basis sequences (32,8,4,4) and (32,16,8) for various degrees for $p=2^{17}$. Results shown in Tables I–III were averaged over 500 runs.

TABLE I

| Degree: | 4096 | 2048 | 1024 | 512 | 256 | 128 | 64 | 32 | 16 | 8 | 4 | 2 | 1 |
|---|---|---|---|---|---|---|---|---|---|---|---|---|---|
| Performance: | 82 | 53 | 35 | 20 | 13 | 8.1 | 5.3 | 3.7 | 2.6 | 1.9 | 1.5 | 1.2 | 1.0 |

TABLE II

| Degree | Basis Sequence | Phase 1 | Phase 2 | Phase 3 | Phase 4 | Performance |
|---|---|---|---|---|---|---|
| 4096 | (8,8,8,8) | 1.51 | .64 | .37 | .17 | 2.7 |
| 2048 | (16,8,8,4) | 1.60 | .67 | .38 | .10 | 2.8 |
| 1024 | (32,8,4,4) | 1.71 | .71 | .26 | .14 | 2.8 |
| 512 | (32,8,4,4) | 1.46 | .92 | .32 | .16 | 2.8 |
| 256 | (128,8,4) | 1.84 | .73 | .20 | — | 2.8 |
| 128 | (256,4,4) | 1.90 | .52 | .25 | — | 2.7 |
| 64 | (512,8) | 1.95 | .66 | — | — | 2.6 |
| 32 | (1024,4) | 1.98 | .46 | — | — | 2.4 |
| 16 | (1024,4) | 1.58 | .64 | — | — | 2.2 |

TABLE III

| | Degree: | | | | | | | | | | | | |
|---|---|---|---|---|---|---|---|---|---|---|---|---|---|
| | 4096 | 2048 | 1024 | 512 | 256 | 128 | 64 | 32 | 16 | 8 | 4 | 2 | 1 |
| (32,8,4,4): | 3.4 | 3.0 | 2.8 | 2.8 | 3.0 | 3.2 | 3.4 | 3.6 | 3.8 | 4.0 | 4.1 | 4.1 | 4.1 |
| (32,16,8): | 3.4 | 3.1 | 3.0 | 3.1 | 3.3 | 3.3 | 3.3 | 3.4 | 3.4 | 3.4 | 3.3 | 3.2 | 3.0 |

At one extreme, there are $2^{17}$ groups of degree one, which therefore do not require combining. The patterns are (32,r)-patterns where r depends on the maximum number of requests that the hashed address space placed into one component. The average value of r was determined experimentally to be 54.4. This is just the expected number of objects in a bucket having the most objects if $2^{17}$ objects are placed randomly into $2^{17}$ buckets. Because this is the baseline performance of a pure router with a hashed address space, the run time is computed as a multiple of this basic unit. This multiple is called the performance factor.

At the other extreme, there are 32 groups of degree $2^{12}$, which correspond to each of the components sending requests to the same set of 32 addresses. This requires the highest amount of combining.

Note that the m=1 version of the method (i.e. basis sequence (4096)), is the solution proposed in L. G. Valiant, "A Bridging Model for Parallel Computation," CACM 33:8 (1990):103–111, for patterns of low degree. Referring to Table I, if the degree is no more than the slack (i.e. v/p=32) then the performance is good, the performance factor being no worse than 3.7. This factor improves rapidly as d decreases. On the other hand, the degree is clearly a lower bound on the run time of a one-phase method, and for $d=2^{12}$ gives a performance factor greater than 4096/54.4>75, which is unacceptable.

If the case d=1 is implemented in several phases, then each phase performs hashing with no combining and contributes a factor of about 1 to the overall run time. (The contribution is actually slightly more because the charge is max(q,r) rather than r for a (q,r)-pattern.) This is also the case in early phases of the method if d is small enough that little combining is done in that phase. In phases where much combining is done, the performance factor can exceed one considerably. If the necessary combining is achieved in early phases, however, later phases may execute very fast because only few requests remain in the system. These phenomena can be discerned easily in Table II, where for various values of d, basis sequences are given that achieved factors below 3.

Note that the motivation for the charging policy in the BSP model is that some routers may achieve a satisfactory rate of throughput only when they have enough work to do (i.e. q is high enough when implementing a (q,r)-pattern) in one superstep. Hence, the BSP model has a lower bound on the time for a superstep, determined by some parameters. Where this lower bound is relevant, preference may be given to basis sequences that distribute the time-cost evenly among the phases. On the other hand, there are circumstances, for example, when the phases are implemented asynchronously, when this issue does not arise.

Tables I and II show that if information is given about the degrees of the patterns then a good basis sequence can be found that brings the performance factor below 3 in the whole range, and below 2 if $d \leq 8$. The only assumption here is that the requests all have the same degree, which is the case tested. If there is no information about the degree of concurrency, then, as shown in Table III, the basis sequences (32,8,4,4) and (32,16,8) are good compromises and achieve performance factors of at most about 4 and 3.5 respectively throughout the whole range.

Additional Variants of a Preferred Embodiment

A preferred embodiment as described for addition is "bulk-synchronized" in the sense that each phase has to finish before the next one starts. The correctness of the combining method itself, however, does not require bulk-synchronization, although a particular combining operation may. As each request in a phase arrives at a component, a check can be made to determine whether any other request to the same address has been previously received by the component. If no other requests to the same component has arrived, then the request can be sent on immediately to the next phase, without waiting for the previous phase to complete. Where it is permissible, such an asynchronous implementation will improve performance. For read requests, a preferred embodiment as described is of this asychronous nature. The actual performance in that case depends, however, on the order in which the router delivers the requests. Asynchrony may also be introduced if the requests are transmitted bit-serially.

A preferred embodiment can be adapted to models of parallel computation other than the simple router. One candidate is the S*PRAM that has been suggested as a model of various proposals for optical interconnects. At each cycle in an S*PRAM, any component can transmit a message to any other component, but only those receive messages that have just one targeted at them in that cycle. The sender components find out immediately whether their transmission succeeded. General simulations of the BSP on the S*PRAM with slack (log p), or slightly more, are known and these imply constant factor optimal implementations of a preferred embodiment on the S*PRAM. There also are several possibilities for more efficient direct implementations.

So far, preferred embodiments that implement (q,r)-patterns in a hashed address space have been discussed. The performance is independent of the value of r because of the hashing. Suppose that requests are sent directly to actual addresses as, for example, when implementing a direct BSP algorithm. A preferred embodiment sends the requests to hashed identifiers first by the method described, and then in one extra phase sends them to the correct destinations. This last phase will be a pattern of degree 1, from randomly distributed sources. Also, it is expected that the targets are distributed approximately uniformly among the components, because that is the purpose of using a direct method. Hence, this extra phase in a preferred embodiment will run fast on the simple router. In particular, if the added last phase is a (q',r')-pattern, and the previous phase is a (q'',r'')-pattern then $q' \leq r''$. Also, $r' \leq r^*$ where $r^*$ is the maximum number of distinct destination addresses targeted in any component. Hence, the cost $\max\{q',r'\}$ is dominated by $r''$, which is controlled by randomization, and by $r^*$ which is controlled by a programmer.

As an alternative embodiment to adding an extra phase to a preferred multi-phase combining method, the last phase may be replaced by another phase that sends the requests directly to the actual address rather than hashing the destination address. This will be efficient if the number of requests destined for each physical component is small enough. When counting this number here, allowance must be made for the multiplicity of each request group as defined by its degree in the last phase of the basic method.

When implementing this multi-phase method, provision must to be made, by software or hardware or some combination, for storing at each phase the sources of the converging requests, so this trace can be used for any necessary reverse flow of information. These provisions are also useful for implementing concurrent accesses when the decomposition of the pattern into phases is handcrafted by a programmer. This may be worthwhile for the sake of greater efficiency, for patterns that have a structure well-known to the programmer. A preferred embodiment, therefore, is also consistent with such direct implementations of concurrent accesses.

Finally, a preferred combining method can be used for applications other than accesses. When requests are combined, it is meaningful to perform operations on their contents that are commutative and associative. The method can be used, for example, to find the sum, product, minimum, or Boolean disjunction over arbitrary sets of elements simultaneously.

Equivalents

Those skilled in the art will know, or be able to ascertain using no more than routine experimentation, many equivalents to the specific embodiments of the invention described herein.

These and all other equivalents are intended to be encompassed by the following claims.

I claim:

1. In a parallel processing computer system having a plurality of components interconnected by a distribution system, each component having an identifier on the distribution system, a universal multiple-phase method of routing a plurality of requests, the requests originating from at least one source component having a source identifier and each request referencing a target address accessible by a target destination component having a target identifier, comprising the steps of:

originating a first request from a first source component;

redirecting, through a non-sorting function, the first request across the distribution system away from the target destination component and toward an intermediate destination component having an intermediate identifier not equal to the target identifier;

combining a plurality of requests including the first request at the intermediate destination component into a single destination request formed for the target address, the single destination request having a single reference to the target address computed by operating on the references to the target address in the plurality of requests; and directing the destination request across the distribution system toward the target destination component having access to the target address.

2. The method according to claim 1 wherein the step of redirecting requests comprises selecting the intermediate destination component by a hashing process.

3. The method according to claim 1 wherein the step of combining requests comprises at least a second phase of further redirecting a second request across the distribution away from the target destination component and toward an intermediate destination component having an intermediate identifier not equal to the target identifier and further combining requests.

4. The method according to claim 1 wherein the step of redirecting a first request comprises determining the intermediate identifier dependent on the target address.

5. The method according to claim 4 wherein the step of determining is based partially on the target address and partially independent of the target address.

6. The method according to claim 5 wherein the intermediate identifier is partially based on the target address through a hash function.

7. The method according to claim 5 wherein the intermediate identifier is partially based on a substantially random choice.

8. The method according to claim 5 wherein the intermediate identifier is partially based on the source component.

9. In a parallel processing computer system having a plurality of components interconnected by a distribution system, each component having an identifier on the distribution system, a universal multiple-phase method of routing a plurality of requests, the requests originating from at least one source component having a source identifier and each request referencing a target address accessible by a target destination component having a target identifier, comprising the steps of:

forming a destination request for a target address from at least one combined request, comprising at least one phase of the forming steps:

redirecting, through a non-sorting function, a request across the distribution system away from the target destination component and toward an intermediate destination component having an intermediate identifier dependent on the target address of the request, the intermediate identifier not equal to the target identifier; and at the intermediate component, combining a plurality of received requests having a shared target address to form a single combined request, the single combined request having a single references to the target address computed by operating on the references to the target address in the plurality of received requests; and in a last phase, directing the destination request across the distribution system toward the target destination component having access to the target address.

10. The method according to claim 9 wherein the step of redirecting a request across the distribution system comprises determining the intermediate identifier based partially on the target address and partially independent of the target address.

11. The method according to claim 10 wherein the intermediate identifier is partially based on the target address through a hash function and partially based on a substantially random choice.

12. The method according to claim 11 wherein the intermediate identifier is partially based on the target address through a hash function and partially based on the source identifier.

13. The method according to claim 9 wherein the step of combining comprises performing commutative and associative operations on the requests that reference the same target address.

14. The method according to claim 9 wherein the step of directing the destination request comprises determining the respective target identifier using a hash function.

15. The method according to claim 9 wherein the step of directing the destination request comprises setting the target identifier to reference a component having access to the target address.

16. The method according to claim 9 further comprising the step of providing a basis sequence of m integers, there being one integer for a respective phase with a first integer corresponding to a first phase and a last integer corresponding to the last phase, each integer indicating the number of requests that can be combined for each respective phase, the product of the integers equaling the number of components on the system.

17. The method according to claim 16 wherein the step of providing a basis sequence comprises providing integers that are powers of 2.

18. In a parallel processing computer system having a plurality of components interconnected by a distribution system, each component having an identifier on the distribution system, a universal multiple-phase method of routing a plurality of requests, the requests originating from at least one source component having a source identifier and each request referencing a target address accessible by a target destination component having a target identifier, comprising the steps of:

providing a basis sequence of m integers, there being one integer for a respective phase with a first integer corresponding to a first phase and a last integer corresponding to a last phase, each integer indicating the number of requests that can be combined for each respective phase;

forming a destination request from at least one combined request, comprising m-1 phases of the forming steps:

redirecting, through a non-sorting function, a request across the distribution system away from the target destination component and toward an intermediate component having an intermediate identifier dependent on the target address of the request, the intermediate identifier not equal to the destination identifier;

at the intermediate component, receiving a plurality of requests which have traversed the distribution system; and at the intermediate component, combining a plurality of received requests having a shared target address using commutative and associative operations on the references to the target address in the plurality of requests to form a single combined request having a single reference to the target address; and in the $m^{th}$ phase, directing the destination request across the distribution system toward the target destination component having access to the target address.

19. The method according to claim 18 wherein the step of providing the basis sequence comprises providing integers that are powers of 2.

20. The method according to claim 18 wherein the step of redirecting a request across the distribution system comprises determining the intermediate identifier based partially on the target address and partially independent of the target address.

21. The method according to claim 20 wherein the intermediate identifier is partially based on the target address through a hash function and partially based on a substantially random choice.

22. The method according to claim 21 wherein the intermediate identifier is partially based on the target address through a hash function and partially based on the source component.

23. The method according to claim 18 wherein the step of directing the destination request comprises determining the target identifier using a hash function.

24. The method according to claim 18 wherein the step of directing the destination request comprises setting the target identifier to be a component having access to the target address.

25. A universal multiple-phase system for routing requests on a parallel processing computer, comprising:

a plurality of components on the system, each component having an identifier on the system;

a plurality of source requests, each source request originating from a source component and referencing a target address, the source requests being addressed by a plurality of source components to at least one selected component such that the selected components combine the source requests into at least one single combined request having a single reference to the target address by operating on the references to the target address in the plurality of source requests; and a distribution system interconnecting the components for directing the requests between components, each source request being redirected, through a non-sorting function, from the originating source component across the distribution system away from the target destination component having access to the target address and toward the associated selected component.

26. The system according to claim 25 further comprising a basis sequence of integers for controlling the redirecting of requests, the basis sequence specifying the number of phases and the number of requests that can be combined in each phase.

27. The system according to claim 26 wherein:

for at least one phase, the source requests are redirected based on the basis sequence to selected components having intermediate identifiers, where source requests that share a common target address are combined; and at the end of the at least one phase, destination requests are formed for the target addresses.

28. The system according to claim 27 wherein each destination request is routed to the target destination component having access to the target address.

29. The system according to claim 26 wherein each integer in the basis sequence is an even power of 2.

30. The system according to claim 25 wherein the phases are synchronous.

31. The system according to claim 25 wherein the phases are not synchronous.

32. The system according to claim 25 wherein the components comprise both processors and memory.

33. The system according to claim 32 wherein the target address is located within the address space of a target destination component.

34. The system according to claim 25 further comprising a hashing process to select the at least one selected component.

35. The system according to claim 25 wherein the distribution system is a point-to-point distribution system.

36. The system according to claim 35 wherein the point-to-point distribution system is a router.

37. The system according to claim 25 wherein the distribution system is an optical communications medium.

38. The system according to claim 25 wherein each component identifier is unique from all other component identifiers on the system.

39. The method according to claim 1 wherein each component identifier is unique from all other component identifiers on the distribution system.

40. The method according to claim 9 wherein each component identifier is unique from all other component identifiers on the distribution system.

41. The method according to claim 18 wherein each component identifier is unique from all other component identifiers on the distribution system.

42. The method according to claim 1 wherein the first request arrives unaltered at the intermediate destination component after traversing the distribution system.

43. The method according to claim 9 further comprising, at the intermediate component, the step of receiving the request after the request has traversed the distribution system.

44. The method according to claim 18 where the step of providing a basis sequence comprises providing integers having a product equaling the number of components on the computer system.

45. A universal multiple-phase system for routing requests on a parallel processing computer, comprising:

a plurality of components for generating and processing requests, each component having a unique identifier on the system;

a plurality of source requests, each source request originating from a source component from the plurality of components and referencing a target address, each source request being redirected by the respective source component toward at least one selected intermediate destination component from the plurality of components, each intermediate destination component selected for receiving a source request by a non-sorting hashing function based at least partially on the target address of the source request and not dependent on all requests currently in the computer, each intermediate destination component combining a plurality of received requests referencing a common target address into a single combined request referencing the common target address, the single combined request having a single reference to the common target address, the single combined request being computed by operating on the references to the target address in the plurality of received requests; and a distribution system interconnecting the components and optimized for routing the requests between components, each source request being redirected from the originating source component across the distribution system away from the target destination component and toward the addressed intermediate destination component, at least one source request arriving unaltered at the addressed intermediate destination component after traversing the distribution system.

46. The system according to claim 45 wherein the combined request is redirected across the distribution system by the respective intermediate destination component to a component selected by the hashing function based on the common destination address, the combined request arriving unaltered at the selected component after traversing the distribution system.

47. The system according to claim 45 wherein the distribution system has an optimized path from the source component to the target destination component, the source request traversing a redirected path from the source component to the intermediate destination component, the optimized path not including the redirected path.

* * * * *